(12) United States Patent
Hackenschmied et al.

(10) Patent No.: US 8,618,488 B2
(45) Date of Patent: Dec. 31, 2013

(54) METHOD FOR PRODUCING A SCINTILLATOR AND SCINTILLATOR

(75) Inventors: Peter Hackenschmied, Nürnberg (DE); Stefan Wirth, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 257 days.

(21) Appl. No.: 13/036,041

(22) Filed: Feb. 28, 2011

(65) Prior Publication Data

US 2011/0210254 A1 Sep. 1, 2011

(30) Foreign Application Priority Data

Mar. 1, 2010 (DE) .......... 10 2010 009 700

(51) Int. Cl.
*G01T 1/20* (2006.01)

(52) U.S. Cl.
USPC ...................................... 250/361 R

(58) Field of Classification Search
CPC ................................. H01L 21/14663
USPC .................................... 250/361 R
See application file for complete search history.

(56) References Cited

U.S. PATENT DOCUMENTS

| | | | | |
|---|---|---|---|---|
| 3,769,059 A | * | 10/1973 | Driard et al. ............... | 250/458.1 |
| 3,937,965 A | * | 2/1976 | Vasseur ..................... | 378/7 |
| 4,023,039 A | * | 5/1977 | Galves et al. ............... | 250/486.1 |
| 4,337,397 A | * | 6/1982 | Vacher ..................... | 250/363.03 |
| 7,048,872 B2 | * | 5/2006 | Derenzo et al. ........ | 252/301.6 R |
| 7,403,589 B1 | | 7/2008 | Short et al. | |
| 2002/0195565 A1 | | 12/2002 | Lecoq ..................... | 250/363.03 |
| 2009/0050810 A1 | * | 2/2009 | Nagarkar et al. ......... | 250/361 R |

FOREIGN PATENT DOCUMENTS

CN 1520521 8/2004 ............... G01T 1/29

OTHER PUBLICATIONS

Chinese Office Action with full English translation dated Mar. 25, 2013 issued in Chinese Patent Application No. 201110471307.
Kowase, K., (2006), "Photon Counting X-ray CT System with a semiconductor Detector", *Nuclear Science Symposium Conference Record*, 5: 3119-3123, Abstract Only.

* cited by examiner

*Primary Examiner* — Constantine Hannaher
(74) *Attorney, Agent, or Firm* — Harness, Dickey & Pierce, P.L.C.

(57) ABSTRACT

A method is disclosed, in at least one embodiment, for producing a scintillator for a radiation detector, in which the scintillator is produced in layers by depositing a scintillator material using a PVD process. By using a PVD process, owing to lower process temperatures of less than 300° C., it is possible to produce scintillators with decay times of less than 1.1 ns over large surfaces. In this way, the prerequisites for quantitative and energy-selective detection of individual radiation quanta can be satisfied even with fluxes of more than $10^8$ X-ray quanta/mm$^2$*s. At least one embodiment of the invention also relates to a scintillator produced by such a method.

17 Claims, 3 Drawing Sheets

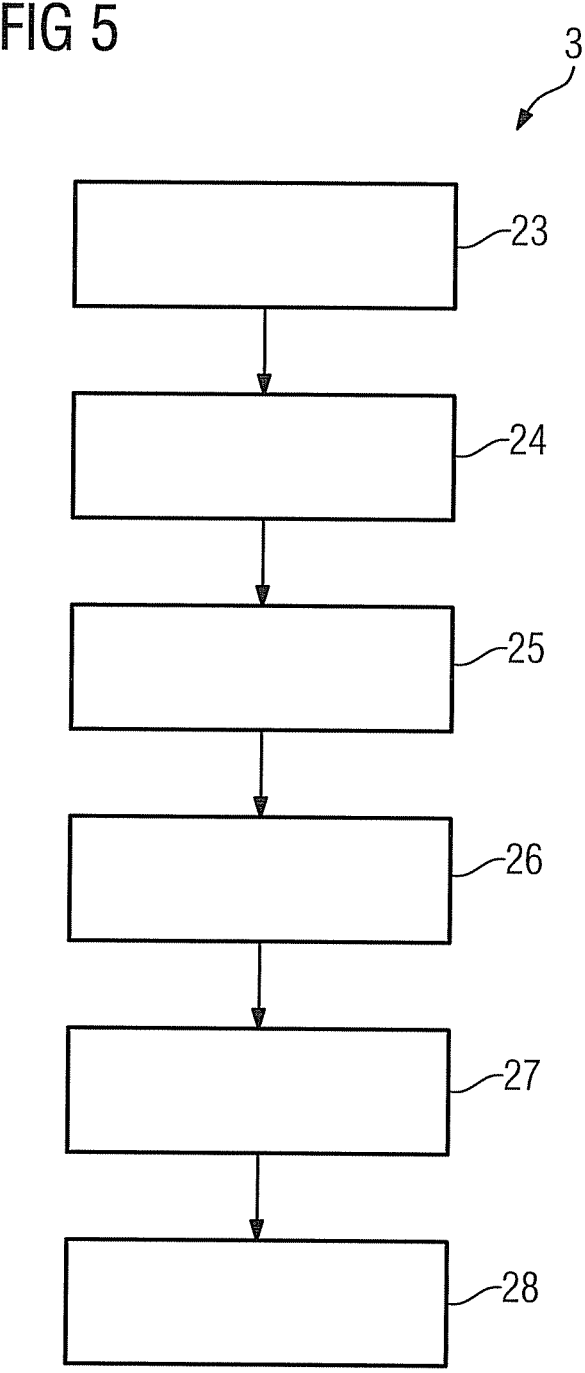

METHOD FOR PRODUCING A SCINTILLATOR AND SCINTILLATOR

PRIORITY STATEMENT

The present application hereby claims priority under 35 U.S.C. §119 on German patent application number DE 10 2010 009 700.4 filed Mar. 1, 2010, the entire contents of which are hereby incorporated herein by reference.

FIELD

At least one embodiment of the invention generally relates to a method for producing a scintillator, and/or to a scintillator.

BACKGROUND

The radiation detectors used in X-ray tomography devices serve to convert X-radiation into electrical signals, which form the starting point for image reconstruction. Currently, indirectly converting radiation detectors based on scintillators are used. With this type of detector, the conversion of the X-rays takes place in two stages. In a first stage, the X-rays are absorbed by means of a scintillator and converted into optically visible light pulses. The scintillator is structured into pixels in order to achieve a certain position resolution. For example, the following compounds are suitable as a scintillator material: $Gd_2O_2S:Pr/Ce$, $(Y,Gd)_2O_3:Eu$, $(Lu_xTb_y)_3Al_5O_{12}:Ce$, CsI:Tl, CsI:Na and $CdWO_4$. The generated light pulses are subsequently converted into electrical signals in a second stage by a photodiode array optically coupled to the scintillator. The photodiode array is made up of a multiplicity of individual photodiodes, and has a structure corresponding to the scintillator.

The known radiation detectors in the field of human medicine operate in an integrative mode, which integrates over the signals of all the radiation quanta which arrive at a pixel within a certain time window. The recorded signals are essentially proportional to the sum of the energy values of the individual incident radiation quanta. However, the information about the number and energy of the individual radiation quanta is lost.

Quantitative and energy-selective detection of the radiation quanta, however, offers a number of advantages specifically in the field of human medical imaging. With quantitative detection of the radiation quanta, for example, image generation is possible with a comparatively low X-ray dose. Additional energy-selective detection of the radiation absorbtion furthermore gives the possibility of material-specific representation and evaluation of the image information.

Such detection proves to be difficult in the field of human medicine, however, since in this case quantum absorption events with comparatively high quantum fluxes, for example more than $10^8$ X-ray quanta/$mm^2*s$, have to be counted.

In order to produce counting radiation detectors for such high quantum fluxes, in a first approach so-called directly converting radiation detectors are studied. In this type of detector, an incident radiation quantum generates free charge carriers in the form of electron-hole pairs, which are also referred to as excitons, in a converter layer as a result of sometimes multistage physical interaction processes with a semiconductor material. For example, semiconductor compounds such as CdTe, CdZnTe, CdTeSe or CdZnTeSe are studied as materials for the converting layer. These materials have a high X-ray absorption in the energy range of medical imaging. A hitherto unresolved problem, however, is that the production process gives rise to defects, owing to which the liberated charge carriers are demobilized, that is to say slowed down or trapped. This so-called polarization effect reduces the separation efficiency of the liberated charge carriers, and leads to broadening of the detected electrical signal. This entails the risk that signals of quanta arriving in close succession will be superimposed so that it is not possible to separate the events. For this reason, directly converting radiation detectors have to date been usable only very limitedly for counting detection of absorption events with high quantum fluxes.

Another approach for the production of a counting detector for high quantum fluxes consists in producing an indirectly converting radiation detector with a faster scintillator and a faster photodiode array. U.S. Pat. No. 7,403,589 B1 discloses such an optically counting radiation detector, in which silicon photomultipliers (SiPM) are used to convert the light pulses generated by the incident radiation quanta into electrical signals. These are special avalanche diodes, which are operated in Geiger mode. In this type of operation, a bias voltage having a value which is close to the breakdown voltage is applied to the diodes. A single exciton can therefore trigger breakdown with a high current value within a few nanoseconds. With this technology, it is possible to achieve low-noise detection of the scintillation photons with a high temporal and spatial resolution which is necessary for high-flux application. A limiting factor of counting detection is currently the comparatively slow decay time of the scintillator. The scintillator known from U.S. Pat. No. 7,403,589 B1 comprises a scintillator material from the following group: LYSO, LaBr3 or LuTAG. These scintillators have decay times in a range of from 15 ns to 50 ns. For counting detection of absorption properties with high quantum fluxes of more than $10^8$ X-ray quanta/$mm^2*s$, however, scintillators which have decay times of less than 5 ns are necessary.

SUMMARY

In at least one embodiment of the present invention, a method is provided for producing a scintillator. Further, in at least one embodiment, a scintillator is provided, with which the prerequisites for quantitative and energy-selective detection of individual radiation quanta can be satisfied even with quantum fluxes of more than $10^8$ X-ray quanta/$mm^2*s$.

At least one embodiment is directed to a method for producing a scintillator, and at least one embodiment is directed to a scintillator. Advantageous refinements are the subject matter of dependent claims.

A method according to at least one embodiment is directed to producing a scintillator for a radiation detector, the scintillator being produced in layers by depositing a scintillator material using a PVD process.

The PVD (physical vapor deposition) process is a vacuum-based deposition method in which a layer is respectively formed by condensation of a molecular vapor flow of a starting scintillator material being used. Such a process has to date been used in industry essentially to coat tools with hard material layers based on titanium nitride (TiN), titanium carbonitride (TiCN) or titanium aluminum nitride (TiAlN). The coating is carried out with the aim of increasing the resistance of the tool against environmental influences. It is used, for example, as oxidation protection.

The Inventors have discovered that, surprisingly, this PVD process is particularly well-suited for the production of a fast scintillator for a radiation detector. A crucial advantage results from the comparatively low process temperatures to be achieved, in a range of from 100° C. to 300° C. for the production of a scintillation crystal. In fact, with the PVD process, it is in particular possible to use scintillator materials which at such low process temperatures crystallize in a phase in which they have extremely fast decay times of less than or equal to 5 ns, and which would otherwise only be synthesized at substantially higher temperatures with the loss of the fast decay times. The PVD process is furthermore suitable for the production of layer thicknesses in a range of from 1 mm to 3 mm, such as are required for scintillators for an X-ray detector in order to achieve high radiation quantum absorption. It is furthermore particularly economical, and can be carried out with existing PVD apparatus.

Furthermore, the Inventors have discovered that with the PVD process, in particular, homogeneous layer growth can be carried out over large surfaces with economically viable deposition rates in order to produce a scintillator. In a particularly favorable case, the scintillator extends over the entire radiation detector module. The outlay for assembling individual segments is thereby obviated.

In a first configuration of an embodiment of the invention, CuI is advantageously used as the scintillator material. CuI has a high density of 5.67 g/cm$^3$, so that incident X-ray quanta are well absorbed and are converted into light pulses. The photoefficiency is therefore more than 1000 photons/MeV. The emission wavelength lies in a range of 420 nm-430 nm. Light pulses of such a wavelength range can be converted directly into electrical signals by a downstream silicon-based photodiode. Owing to the low process temperatures of less than 300° C., CuI crystallizes in the gamma phase with decay times of less than 1.1 ns. Moreover, decay times of less than 0.27 ns can even be observed, and in a particularly favorable case less than 0.13.

In a second configuration of an embodiment of the invention, CsF is furthermore advantageously used as the scintillator material. At 4.64 g/cm$^3$, the density of CsF is likewise high and therefore well-suited for the absorption of incident X-ray quanta. The photoefficiency of CsF thus has a value of more than 1900 photons/MeV. The emission wavelength is 390 nm and can likewise be converted directly into an electrical signal by a downstream photodiode. Owing to the low process temperatures, the scintillator produced from CsF has decay times in a range of from 2 ns to 4 ns.

Both CuI- and CsF-based scintillators, which are produced using the PVD process, are therefore particularly well-suited for the quantitative and energy-selective detection of absorption events with high fluxes of more than 10$^8$ X-ray quanta/mm$^2$*s.

The use of a PVD process furthermore offers the advantage that, by appropriate selection of process parameters, the morphology of the scintillator and therefore the resulting layer properties can readily be influenced in a controlled way.

For example, by setting process parameters, it is advantageously possible for the PVD process to be controlled in such a way that the scintillator is formed with a continuous crystalline layer structure. In this context, a continuous crystalline structure is intended to mean an essentially compact structure which has essentially no inclusions or cavities.

By setting process parameters, the PVD process may preferably in particular also be controlled so that the scintillator is formed with a needle-shaped layer structure. This has the advantage that no subsequent mechanical processing for pixelation is necessary. In particular it obviates the cutting of the scintillator, which is necessary in order to form a pixel structure when using conventional scintillators made of a ceramic.

By appropriate setting of process parameters, the needles formed in this way may furthermore advantageously be formed with a predeterminable average thickness and/or a predeterminable average distribution density. In this way, by appropriate needle-shaped layer structuring, pixel sizes of less than 500 μm can readily be produced without compromising the quantum efficiency. The needles also form light guides, in which the light pulses propagate with a privileged direction in the longitudinal direction of the needles. Optical crosstalk is therefore reduced to a considerable extent merely by the type of layer structuring.

Process parameters may in this case be for example energy density, process pressure, substrate temperature and geometrical layout of the reaction zones.

In a particularly advantageous configuration of an embodiment of the invention, the scintillator material is deposited directly on a photodiode or a photodiode array as a substrate. Relative positioning of the scintillator and the photodiode array, which is elaborate to carry out, is therefore obviated. In particular, the scintillator and the photodiode array no longer have to be produced with positioning aids, for example in the form of markers. Furthermore, no additional measures are necessary for optical and mechanical coupling of the two elements. This simplifies the production of a radiation detector to a considerable extent.

A second aspect of an embodiment of the invention relates to a scintillator which is produced by the method described above.

BRIEF DESCRIPTION OF THE DRAWINGS

The invention will be explained in more detail below with the aid of example embodiments and with the aid of drawings, in which:

FIG. 5 shows a PVD process for producing the scintillator according to an embodiment of the invention.

DETAILED DESCRIPTION OF THE EXAMPLE EMBODIMENTS

Figure 1:
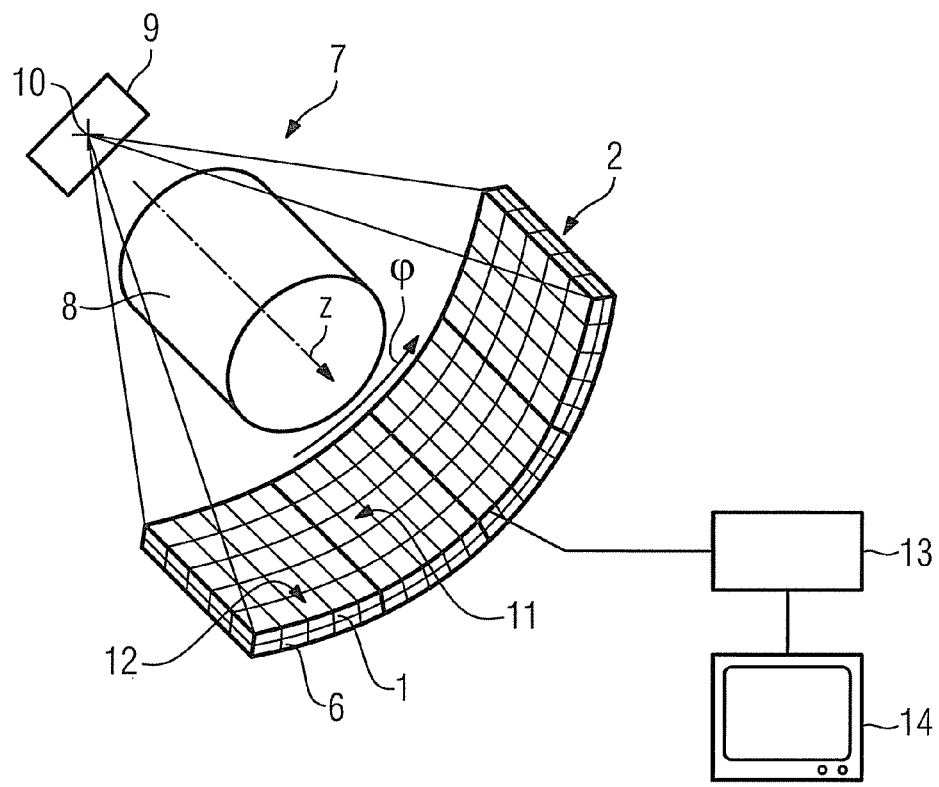
FIG. 1 shows in schematic representation a computed tomography device having a radiation detector according to an embodiment of the invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In the figures, elements which are the same or have the same function are provided with the same references. When elements are repeated in a figure, only one element is respectively provided with a reference for reasons of clarity. The representations in the figures are schematic and not necessarily true to scale; scales may vary between the figures.

FIG. 1 represents in partly perspective and partly block-diagrammatic view an X-ray tomography device in the form of a computed tomography device 7. The computed tomography device 7 comprises a patient support table for supporting a patient 8 to be examined. It furthermore comprises a gantry (not shown) having a recording system 9, 2 which is mounted so that it can rotate about a system axis Z. The recording system 9, 2 comprises an X-ray tube 9 and a radiation detector 2 arranged opposite it, so that X-radiation coming from the focus 10 of the X-ray tube 9 during operation passes through the patient 8 and strikes the radiation detector 2. The radiation detector 2 is segmented into a plurality of radiation detector modules 11 successively in the ϕ direction. Each module 11 has detector pixels 12 arranged in rows and columns. The radiation detector 2 is an indirectly converting detector having a scintillator 1 according to the invention, which is operated for quantitative and energy-selective recording of the radiation absorption events in counting operation.

In order to record an image of an examination region, projections from a multiplicity of different projection directions are recorded during the rotation of the recording system 9, 2 about the system axis Z; for each projection, the radiation detector 2 generates electrical signals from which the number and energy of the individual radiation quanta are determined. As a result of this processing, the radiation detector 2 delivers a set of raw data. In the case of a spiral scan, for example, continuous displacement of the patient support table in the direction of the system axis Z takes place simultaneously during a rotation of the recording system 9, 2. The X-ray tube 9 and the radiation detector 2 therefore move on a helical path around the patient 8 in this type of scan. The raw data generated in this way are serialized in a sequencer and subsequently transmitted to an image computer 13. The image computer 13 contains a reconstruction unit, by which an image is computed from the raw data. Energy-selective detection allows differentiated representation according to tissue type. For example, soft tissue and bone can be represented separately from one another in an image. An image generated in this way is stored in a memory and displayed on a display unit 14 connected to the image computer 13, for example a video monitor.

For counting detection, the radiation detector 2 comprises a scintillator 1 according to the invention based on CuI. The scintillator 1 is produced in layers using a PVD process 3 described below, and has needle-shaped layer structuring which can be seen in FIGS. 3 and 4. It has extremely short decay times of less than 1.1 ns, and is therefore well-suited for the present high-flux application for counting detection of incident radiation quanta with fluxes of more than $10^8$ X-ray quanta/mm$^2$*s. Besides CuI, CsF is also suitable as a fast scintillator base material 4. In the present example embodiment, the scintillator 1 is deposited directly on a photodiode array 6 arranged behind it in the radiation incidence direction. This has the advantage that it obviates the production steps for aligning these two components with one another and for optical and mechanical coupling of the scintillator 1 to the photodiode array 6. It would of course also be conceivable first to synthesize the scintillator 1 on a different substrate to the photodiode array 6 and subsequently assemble it with the photodiode array 6. The photodiode array 6 is an SiPM, i.e. it comprises special avalanche diodes which are operated in a Geiger mode. With such photodiodes, the light pulses generated in the scintillator 1 can likewise be converted into electrical signals and evaluated in the nanosecond range.

Figure 2:
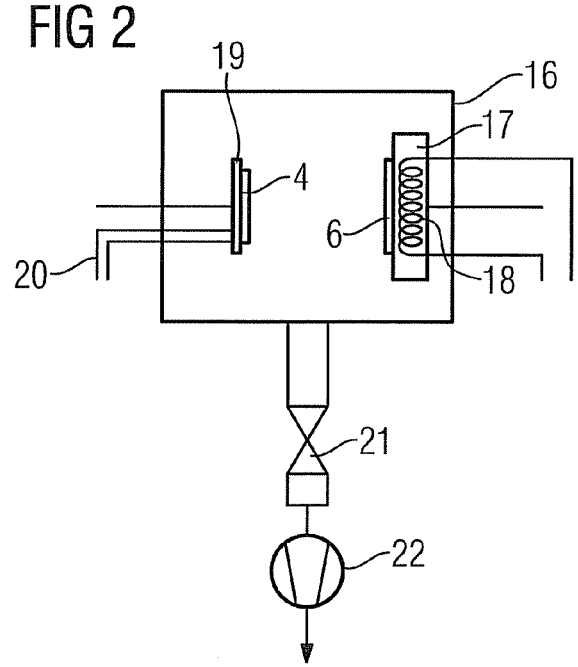
FIG. 2 shows in block-diagrammatic representation a PVD process for producing a scintillator according to an embodiment of the invention.

FIG. 2 shows in block-diagrammatic representation a PVD apparatus 15 for producing the scintillator 1 according to an embodiment of the invention. The PVD apparatus 15 comprises a vacuum chamber 16 in which the substrate, here the photodiode array 6 or the SiPM array, is arranged on a substrate holder 17. The substrate holder 17 is arranged so that it can be rotated, and has a heating element 18 by which the substrate can be heated. Arranged opposite the substrate holder 17 is the target holder 19 for holding the target, or scintillator starting material 4, which in the present example embodiment is CuI. The target holder 19 has means 20 for thermal evaporation of the target. The vacuum chamber 16 can be pumped to a working vacuum by means of a pump 22 connected via a valve 21.

Production of the scintillator 1 by depositing the scintillator material 4 in layers is carried out according to the following process steps which are represented in FIG. 5:

a) 23 setting process parameters,
b) 24 pumping off the PVD apparatus 3 to a working vacuum in a range of from $10^{-4}$ Pa to 10 Pa,
c) 25 heating the substrate holder 17 and the photodiode array 6 or the SiPM array to an operating temperature of up to 300° C. while rotating it,
d) 26 generating a molecular vapor flow by evaporating CuI from the target holder 19,
e) 27 monitoring the layer thickness formation,
f) 28 stopping the vapor flow and cooling the substrate after forming a layer thickness of 3 mm.

Figure 3:
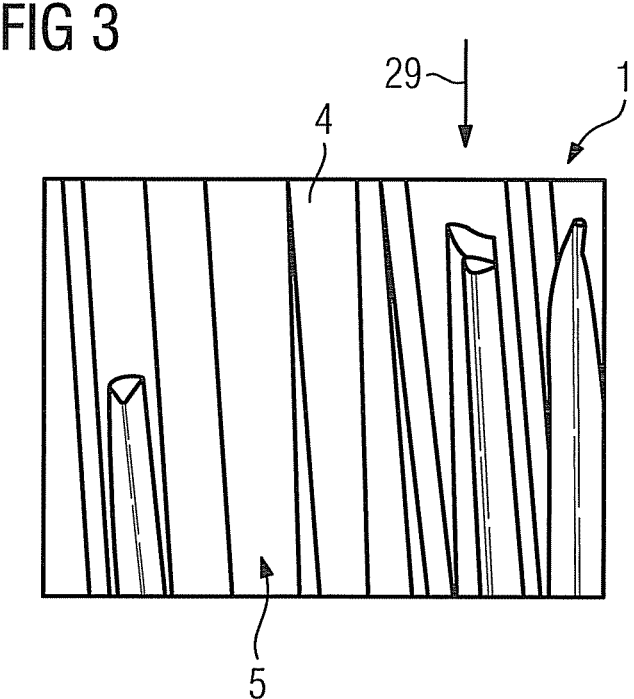
FIG. 3 shows in a side view a detail of a scintillator structured in the form of needles.
Figure 4:
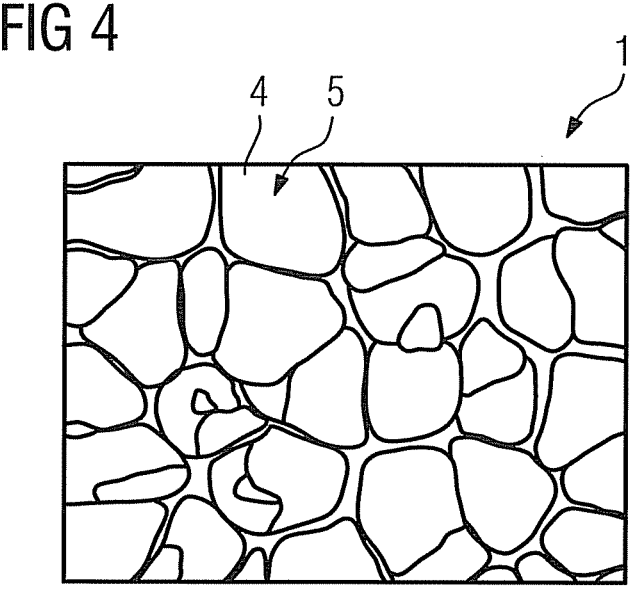
FIG. 4 shows in a plan view a detail of a scintillator structured in the form of needles.

FIG. 3 shows in a side view, and FIG. 4 in a plan view, a detail of a scintillator 1 structured in the form of needles, which is produced according to the method just described. The needles 5 have a thickness of a few micrometers. Their longitudinal axis is oriented along the radiation incidence direction 29. Owing to their geometry, they form light guides in which the light pulses generated by the X-ray quanta propagate preferentially in the direction of the longitudinal axis of the needles 5. This prevents optical crosstalk between neighboring detector pixels. The cross-sectional areas of the needles 5 furthermore thus form the smallest possible surface unit for pixelating the radiation detector 2.

In summary, it may be stated that:

At least one embodiment of the invention relates to a method for producing a scintillator 1 for a radiation detector 2, in which the scintillator 1 is produced in layers by depositing a scintillator material 4 using a PVD process 3. By using a PVD process 3, owing to lower process temperatures of less than 300° C., it is possible to produce scintillators 1 with decay times of less than 1.1 ns over large surfaces. In this way, the prerequisites for quantitative and energy-selective detection of individual radiation quanta can be satisfied even with fluxes of more than $10^8$ X-ray quanta/mm$^2$*s. At least one embodiment of the invention also relates to a scintillator 1 produced by such a method.

The patent claims filed with the application are formulation proposals without prejudice for obtaining more extensive patent protection.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

The subject matter of the dependent claims in relation to the prior art on the priority date may form separate and independent inventions. They may furthermore also contain independent inventions which have a configuration that is independent of the subject matter of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, non-transitory computer readable medium and non-transitory computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory storage medium or non-transitory computer readable medium, is adapted to store information and is adapted to interact with a data processing facility or computer device to execute the program of any of the above mentioned embodiments and/or to perform the method of any of the above mentioned embodiments.

The non-transitory computer readable medium or non-transitory storage medium may be a built-in medium installed inside a computer device main body or a removable non-transitory medium arranged so that it can be separated from the computer device main body. Examples of the built-in non-transitory medium include, but are not limited to, rewriteable non-volatile memories, such as ROMs and flash memories, and hard disks. Examples of the removable non-transitory medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for producing a scintillator for a radiation detector, the method comprising:
producing the scintillator in layers by depositing a scintillator material using a PVD process, wherein the scintillator material is deposited directly on a photodiode or a photodiode array as a substrate.

2. The method as claimed in claim 1, wherein CuI is used as the scintillator material.

3. The method as claimed in claim 2, wherein the PVD process is controlled by setting process parameters so that the scintillator is formed with a continuous crystalline layer structure.

4. The method as claimed in claim 2, wherein the PVD process is controlled by setting process parameters so that the scintillator is formed with a needle-shaped layer structure.

5. The method as claimed in claim 1, wherein CsF is used as the scintillator material.

6. The method as claimed in claim 5, wherein the PVD process is controlled by setting process parameters so that the scintillator is formed with a continuous crystalline layer structure.

7. The method as claimed in claim 5, wherein the PVD process is controlled by setting process parameters so that the scintillator is formed with a needle-shaped layer structure.

8. The method as claimed in claim 1, wherein the PVD process is controlled by setting process parameters so that the scintillator is formed with a continuous crystalline layer structure.

9. The method as claimed in claim 1, wherein the PVD process is controlled by setting process parameters so that the scintillator is formed with a needle-shaped layer structure.

10. The method as claimed in claim 9, wherein the PVD process is controlled by setting process parameters so that the needle-shaped layer structure is formed with needles of at least one of a predeterminable average thickness and a predeterminable average distribution density.

11. A scintillator for a radiation detector comprising a scintillator material arranged directly on a photodiode or a photodiode array as a substrate, wherein the scintillator is produced from a scintillator material deposited in layers using a PVD process.

12. The scintillator as claimed in claim 11, wherein the scintillator material is CuI.

13. The scintillator as claimed in claim 11, wherein the scintillator material is CsF.

14. The scintillator as claimed in claim 11, wherein the scintillator has a continuous crystalline layer structure.

15. The scintillator as claimed in claim 11, wherein the scintillator has a needle-shaped layer structure.

16. The scintillator as claimed in claim 15, wherein the needle-shaped layer structure comprises needles of at least one of a predeterminable average thickness and a predeterminable average distribution density.

17. A radiation detector comprising the scintillator as claimed in claim 11.

* * * * *